United States Patent
Kim

(10) Patent No.: US 9,897,836 B2
(45) Date of Patent: Feb. 20, 2018

(54) DISPLAY DEVICE COMPRISING A BOTTOM CHASSIS HAVING A HEMMING UNIT OVERLAPPING A SUPPORT BENT FROM A BOTTOM MEMBER

(71) Applicant: Samsung Display Co., Ltd., Yongin, Gyeonggi-Do (JP)

(72) Inventor: Taechang Kim, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 67 days.

(21) Appl. No.: 14/813,283

(22) Filed: Jul. 30, 2015

(65) Prior Publication Data
US 2016/0116787 A1   Apr. 28, 2016

(30) Foreign Application Priority Data
Oct. 23, 2014 (KR) .................. 10-2014-0144391

(51) Int. Cl.
*G02F 1/1333* (2006.01)

(52) U.S. Cl.
CPC .... *G02F 1/133308* (2013.01); *G02F 2201/46* (2013.01); *G02F 2201/465* (2013.01)

(58) Field of Classification Search
CPC ......... G02F 1/133308; G02F 2201/465; G02F 1/1333
See application file for complete search history.

(56) References Cited

U.S. PATENT DOCUMENTS

| | | | |
|---|---|---|---|
| 2007/0132908 A1* | 6/2007 | Kim | G02F 1/133308 349/58 |
| 2008/0278895 A1* | 11/2008 | Woo | G02F 1/133308 361/679.02 |
| 2008/0303971 A1* | 12/2008 | Lee | G02F 1/133308 349/58 |
| 2009/0237587 A1* | 9/2009 | Won | G02B 6/0081 349/58 |
| 2014/0118911 A1 | 5/2014 | Tang et al. | |

FOREIGN PATENT DOCUMENTS

| | | |
|---|---|---|
| KR | 10-2007-0037862 A | 4/2007 |
| KR | 10-2007-0044136 A | 4/2007 |
| KR | 10-2008-0022991 A | 3/2008 |

\* cited by examiner

*Primary Examiner* — Paul Lee
(74) *Attorney, Agent, or Firm* — H.C. Park & Associates, PLC

(57) ABSTRACT

A display device includes: a display panel; a bottom chassis accommodating the display panel and including a bottom member, a support bent from the bottom member, and a hemming unit overlapping the support; and a mold frame coupled to the bottom chassis and including a projection. The bottom chassis may have a coupling hole into which the projection is inserted and have a bent member extending from a side of the coupling hole.

16 Claims, 4 Drawing Sheets

DISPLAY DEVICE COMPRISING A BOTTOM CHASSIS HAVING A HEMMING UNIT OVERLAPPING A SUPPORT BENT FROM A BOTTOM MEMBER

CLAIM OF PRIORITY

This application makes reference to, incorporates the same herein, and claims all benefits accruing under 35 U.S.C. § 119 from an application earlier filed in the Korean Intellectual Property Office on 23 Oct. 2014 and there duly assigned Serial No. 10-2014-0144391.

BACKGROUND OF THE INVENTION

Field of Invention

Embodiments of the present invention relate to a display device improved in coupling force between a mold frame and a bottom chassis.

Description of the Related Art

A liquid crystal display (LCD) is a type of flat panel displays (FPDs), which is most widely used these days. The LCD includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

An LCD, which is a passive light emitting device, may include a display panel configured to display images on a screen, a mold frame on which the display panel is mounted, and a backlight assembly configured to provide light to the display panel. The mold frame may be coupled to the bottom chassis that forms a framework of the backlight assembly using coupling structures such as a hook.

Meanwhile, LCD devices with slimmer structure and lighter weight have been developed so as to improve product competitiveness. In particular, studies have been conducted to develop an LCD device reduced in overall size by reducing a width of a bezel, that is, a distance between an outer edge of the LCD device and an adjacent side of an active area that, in practice, displays an image. In order to achieve such a narrow bezel, a support of a bottom chassis has been reduced in thickness. As the thickness of the support of the bottom chassis is reduced, coupling force of a hook structure between the mold frame and the bottom chassis is weakened, and defects of bent mold frame or bent bottom chassis may occur. Further, as a hook formed on a bottom chassis or a mold frame is easily broken, defects of poor coupling may occur.

Accordingly, a coupling structure improved in coupling force between a mold frame and a bottom chassis is required.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a display device improved in coupling force of a hook coupling structure between a mold frame and a bottom chassis and enhanced in device strength.

According to an exemplary embodiment, a display device includes: a display panel; a bottom chassis configured to accommodate the display panel and including a bottom member, a support bent from the bottom member, and a hemming unit overlapping the support; and a mold frame coupled to the bottom chassis and including a projection. The bottom chassis may have a coupling hole into which the projection is inserted and have a bent member extending from a side of the coupling hole.

The coupling hole may be formed on at least a portion of the bottom member and the support.

The bent member may be bent toward the projection of the mold frame.

The bent member may be in contact with the mold frame.

The mold frame may further include a base member and a side wall member bent from the base member.

The projection may extend from at least a portion of a surface of the side wall member of the mold frame.

The side wall member may be disposed parallel to the support of the bottom chassis.

The display panel may be disposed on the base member of the mold frame.

At least a portion of the support may be disposed on a top surface of the projection.

The hemming unit may have an aperture at an area overlapping the projection of the mold frame.

The aperture may overlap the coupling hole of the bottom chassis.

The hemming unit may be bent from the support of the bottom chassis.

The hemming unit may be in contact with a surface of the support.

The display panel may be disposed on the mold frame.

The display device may further include a top chassis to partly cover the support of the bottom chassis and a top surface of the display panel.

According to embodiments of the present invention, a display device may achieve a narrow bezel and may also stably fix a display panel.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
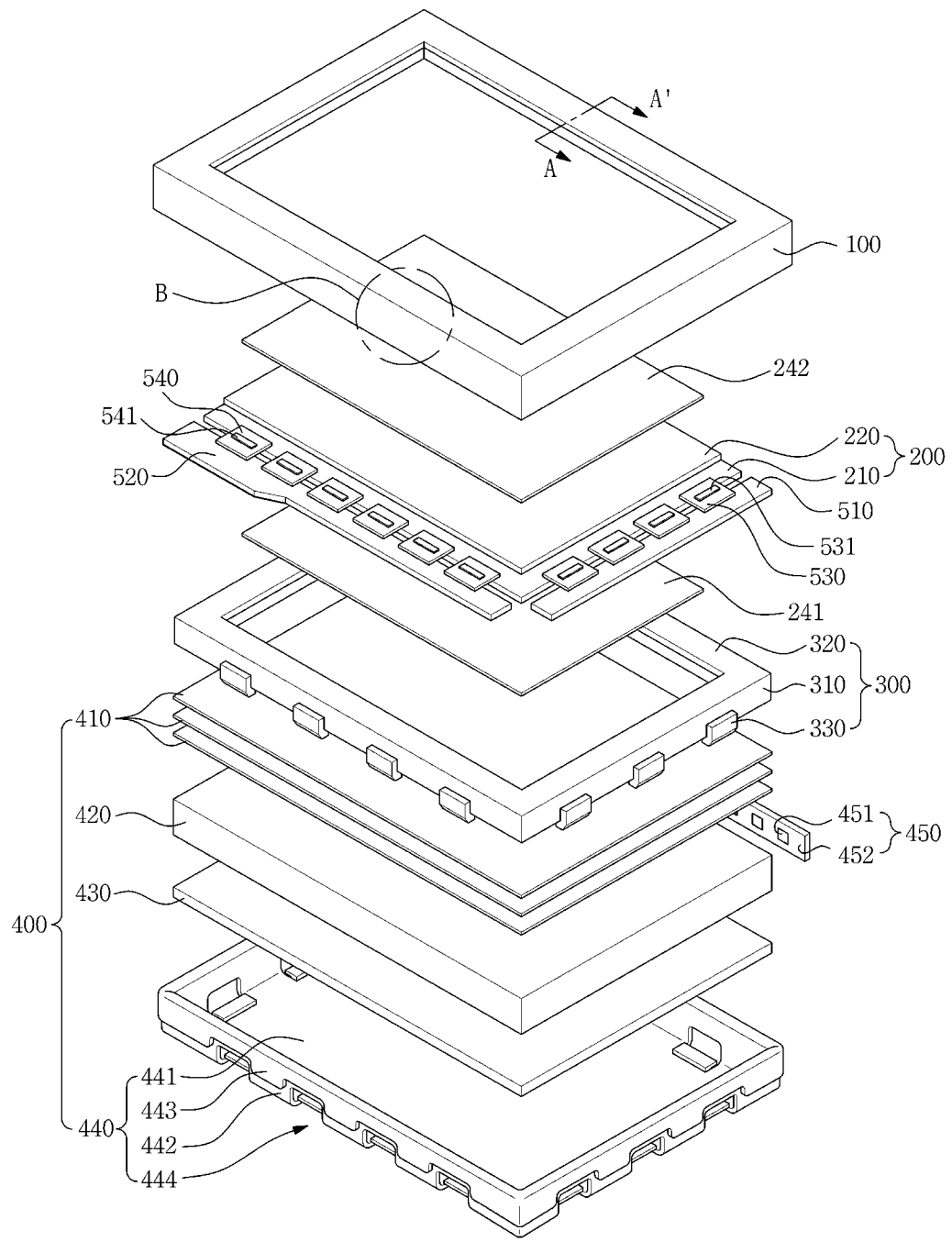
FIG. 1 is a schematic exploded perspective view illustrating a display device according to an exemplary embodiment.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments of the inventive concept and may be modified according to the relevant art and the intention of an applicant. Therefore, the terms used herein should be interpreted as having a meaning that is consistent with their meanings in the context of the present disclosure, and is not intended to limit the invention. As used herein, the singular forms "a," "an," and "the" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to an exemplary embodiment is described below in detail with reference to FIGS. 1 and 2.

FIG. 1 is a schematic exploded perspective view illustrating a display device according to an exemplary embodiment. FIG. 2 is a cross-sectional view taken along line A-A' of FIG. 1.

Figure 2:
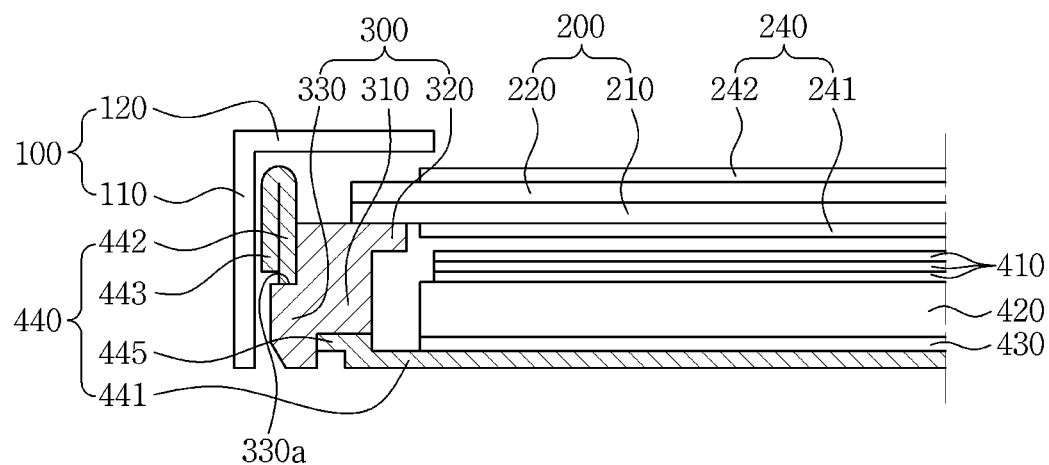
FIG. 2 is a cross-sectional view taken along line A-A' of FIG. 1.

Referring to FIGS. 1 and 2, the display device may include a display panel 200 configured to display images, a backlight assembly 400 configured to provide light to the display panel 200, a top chassis 100 provided in a form of surrounding the display panel 200, and a mold frame 300 on which the display panel 200 is mounted.

The top chassis 100 may be coupled to a bottom chassis 440 so as to cover an edge portion of the display panel 200 mounted on the mold frame 300. The top chassis 100 may have a side surface portion 110 coupled to the bottom chassis 440 and a top surface portion 120 bent and extending from the side surface portion 110. The edge portion of the display panel 200 covered by the top chassis 100 is a non-display area in which images are not displayed. The top chassis 100 may have an opening at a center portion and the display panel 200 may be exposed through the opening of the top chassis 100.

Further, the top chassis 100 may protect driving-chip mounting films 530 and 540 and printed circuit boards 510 and 520 and may prevent them from being detached from the bottom chassis 440.

In this case, the top chassis 100 may be coupled to the bottom chassis 440 by hooks and/or screws. Further, the top chassis 100 and the bottom chassis 440 may be coupled to each other in various structures.

The display panel 200 is configured to display images. The display panel 200 may be a light-receiving type display panel and may be categorized into an LCD panel, an electrowetting display panel, an electrophoretic display panel, a microelectromechanical system (MEMS) display panel, and the like. It is assumed that an LCD panel is used as one embodiment of the present invention.

The display panel 200 may be provided in a quadrilateral panel form having two pairs of parallel sides. According to an exemplary embodiment, the display panel 200 may be a rectangular in shape having a pair of long sides and a pair of short sides. The display panel 200 may include a first substrate 210, a second substrate 220 facing the first substrate 210, and a liquid crystal layer (not illustrated) interposed between the first and second substrates 210 and 220. The display panel 200, when viewed in a plane, may have a display area which displays an image and a non-display area which surrounds the display area and does not display an image. The non-display area may be covered by the top chassis 100.

The first substrate 210 may include a plurality of pixel electrodes (not illustrated) and a plurality of TFTs (not illustrated) electrically connected to the pixel electrodes in one-to-one correspondence. A data line may be connected to a source electrode of the TFT, a gate line may be connected to a gate electrode thereof, and a pixel electrode may be connected to a drain electrode thereof. Each TFT may function as a switch of a driving signal supplied to the corresponding pixel electrode. Further, the second substrate 220 may include a common electrode (not illustrated) forming an electric field that controls an arrangement of the liquid crystals along with the pixel electrodes. The display panel 200 may be configured to drive the liquid crystal layer to display an image frontwards.

The display panel 200 may include: driving chips 531 and 541 configured to apply a driving signal; the driving-chip mounting films 530 and 540 on which the driving chips 531 and 541 are mounted; and printed circuit boards (PCBs) 510 and 520 electrically connected to the display panel 200 through the driving-chip mounting films 530 and 540. The driving-chip mounting film may be a tape carrier package (TCP).

The driving-chip mounting films 530 and 540 and PCBs 510 and 520 may be bent from one end portion of the display panel 200 and disposed on a side surface of the mold frame 300.

The driving chips 531 and 541 may generate a driving signal for driving the display panel 200 in response to an external signal. The external signal may be supplied from the PCBs 510 and 520 and may include an image signal, multiple control signals, and a driving voltage.

For example, the gate PCB 510 may be connected to the gate driving-chip mounting film 530. The gate PCB 510 may supply an image signal to the gate driving chip 531. The data PCB 520 may be connected to the data driving-chip mounting film 540. The data PCB 520 may supply an image signal to the data driving chip 541.

The gate driving chip 531 may receive the image signal and supply a gate driving signal to the gate line. The data driving chip 541 may receive the image signal and supply a data driving signal to the data line.

Polarizers 240 may be disposed on the display panel 200 and include first and second polarizers 241 and 242. The first and second polarizers 241 and 242 may be respectively disposed on the opposite sides of facing surfaces of the first and second substrates 210 and 220. That is, the first polarizer 241 may be attached on an outer side of the first substrate 210 and the second polarizer 242 may be attached on an outer side of the second substrate 220. A transmissive axis of the first polarizer 241 may be substantially at right angles to a transmissive axis of the second polarizer 242.

The mold frame 300 may be coupled to the bottom chassis 440 and accommodate the display panel 200. The mold frame 300 may be formed of a flexible material such as plastics, in order to prevent damage on the display panel 200.

The mold frame 300 may be provided along the edge portion of the display panel 200 and support the display panel 200 from the lower portion thereof. The mold frame 300 may be provided in areas corresponding to four sides or at least a portion of the four sides of the display panel 200. For example, the mold frame 300 may have a quadrilateral-loop form corresponding to the four sides of the display panel 200, or may have a C-shape, that is a quadrilateral open-loop form corresponding to three sides of the edge portion of the display panel 200.

The backlight assembly 400 may include an optical sheet 410, a light guide plate 420, a reflective sheet 430, the bottom chassis 440, and a light source unit 450.

The light source unit 450 may include a light source 451 and a circuit board 452 on which the light source 451 is disposed. The light source 450 may be disposed at a corner portion or on a light incident side surface of the light guide plate 420. In other words, the light source 450 may emit light from the corner portion or the light incident side surface of the light guide plate 420.

The light source 451 may include at least one LED chip (not illustrated) and a package (not illustrated) for accommodating the LED chip. The light source 451 may have a light emitting surface in a direction where the light guide plate 420 is disposed.

The circuit board 452 may be made of a PCB or a metal PCB.

Such a light source unit 450 may be provided on one, two, or four side surfaces of the light guide plate 420, in consideration of size and luminance uniformity of the display panel 200. In some embodiments, the light source unit 450 may be formed on at least one corner portion of the light guide plate 420.

Light emitted from the light source 451 may be incident on the light incident side surface of the light guide plate 420 and emitted to the light emitting surface thereof. The light guide plate 420 may be configured to uniformly supply light supplied from the light source unit 450 to the display panel 200. The light guide plate 420 may be disposed adjacent to the light source unit 450 and accommodated in the bottom chassis 440. The light guide plate 420 may be provided, for example, in a quadrilateral panel form as the display panel 200, but is not limited thereto. In some embodiments, when an LED chip is used as the light source 451, the light guide plate 420 may have various forms including a predetermined groove and/or a protrusion according to a position of the light source 451.

Although referred to as a plate for ease of description, the light guide plate 420 may be in a shape of a sheet or a film, thereby realizing a slim display device. That is, light guide plate 420 is to be understood as having a shape that includes not only a plate but also a film for guiding light.

The light guide plate 420 may be formed of a light-transmissive material. The light-transmissive material may include, for example, an acrylic resin, such as polymethylmethacrylate (PMMA), or polycarbonate (PC) so as to guide light efficiently.

A pattern may be formed on at least one surface of the light guide plate 420. For example, a scattering pattern (not illustrated) may be formed on a lower surface thereof, so as to scatter and/or reflect the guided light upwards.

The optical sheet 410 may be disposed on the light guide plate 420 and configured to diffuse and/or collect light directed from the light guide plate 420. The optical sheets 410 may include one or more of a diffusion sheet, a prism sheet, a protective sheet, and other functional sheets.

The diffusion sheet may be configured to disperse light incident from the diffusion plate 420 so as to prevent the light from being partly concentrated.

The prism sheet may include prisms having a triangular cross-section (not illustrated) and formed in a predetermined array on one surface thereof. The prism sheet may be disposed on the diffusion sheet and may collect light diffused from the diffusion sheet in a direction perpendicular to the display panel 200.

The protective sheet may be disposed on the prism sheet and may serve to protect a surface of the prism sheet and diffuse light to achieve uniform light distribution.

The reflective sheet 430 may be disposed between the light guide plate 420 and the bottom chassis 440, and reflect light emitted downwards from the diffusion plate 420 to be directed toward the display panel 200, thereby improving light efficiency.

The reflective sheet 430 may be formed of, for example, polyethylene terephthalate (PET) to achieve reflectivity. One surface thereof may be coated with a diffusion layer containing, for example, titanium dioxide.

In some embodiments, the reflective sheet 430 may be formed of a material containing metal, such as silver (Ag).

The bottom chassis 440 may accommodate the reflective sheet 430 and the light guide plate 420. A bottom member 441 of the bottom chassis 440 may be parallel to the light guide plate 420. The bottom chassis 440 may be formed of a rigid metal material, such as stainless steel, or a material having good heat dissipation properties, such as aluminum or an aluminum alloy. According to an exemplary embodiment, the bottom chassis 440 is responsible for maintaining a framework of the display device and protecting a variety of components accommodated therein.

Hereinafter, the mold frame 300 and the bottom chassis 440 according to an exemplary embodiment are described below with reference to FIGS. 3 to 7.

Figure 3:
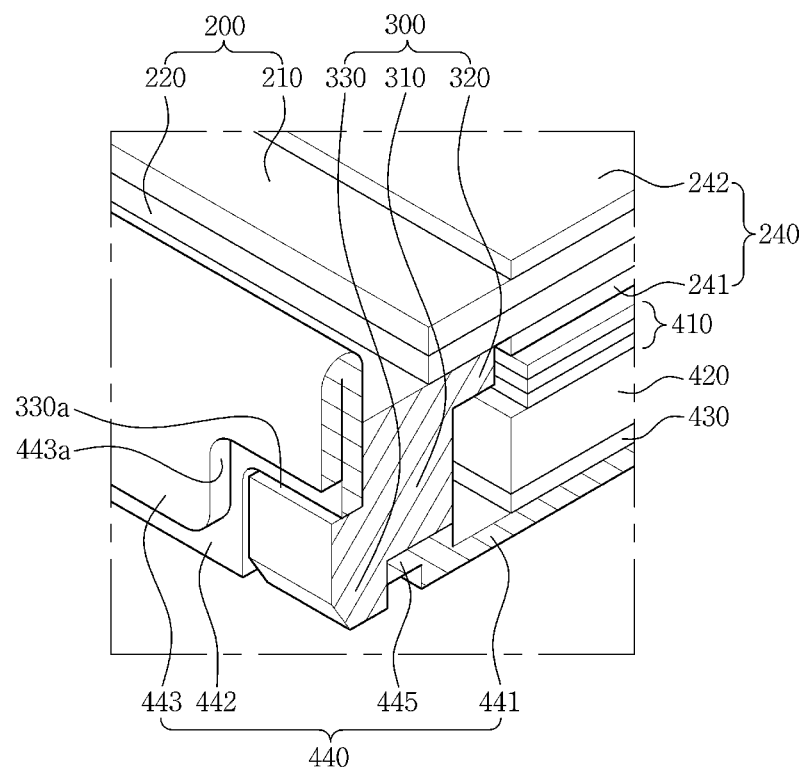
FIG. 3 is a partial exploded perspective view illustrating "B" portion of FIG. 1.
Figure 4:
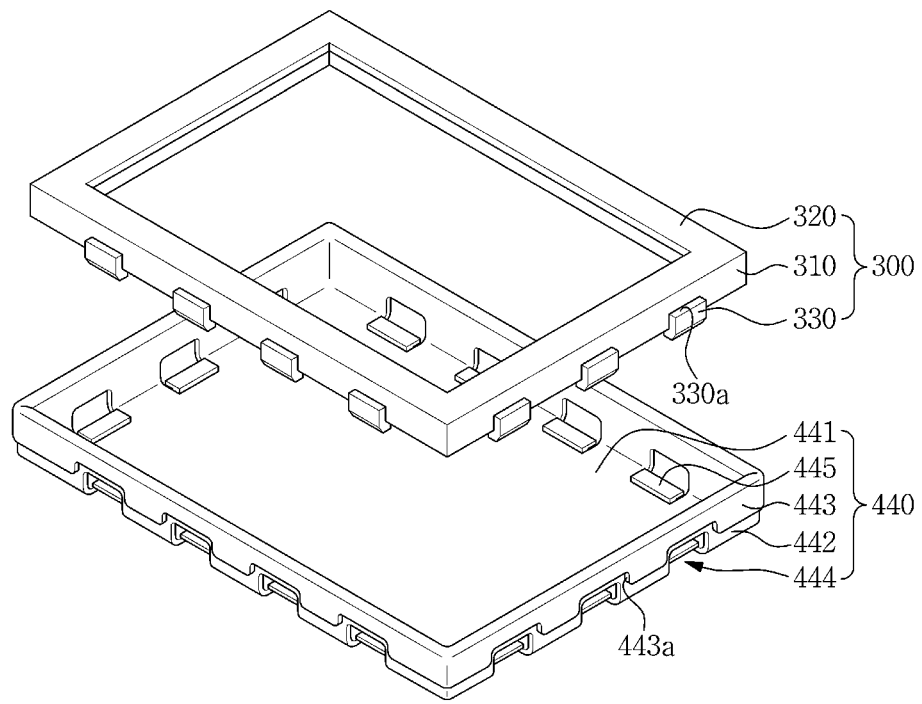
FIG. 4 is a schematic exploded perspective view illustrating a mold frame and a bottom chassis.
Figure 5:
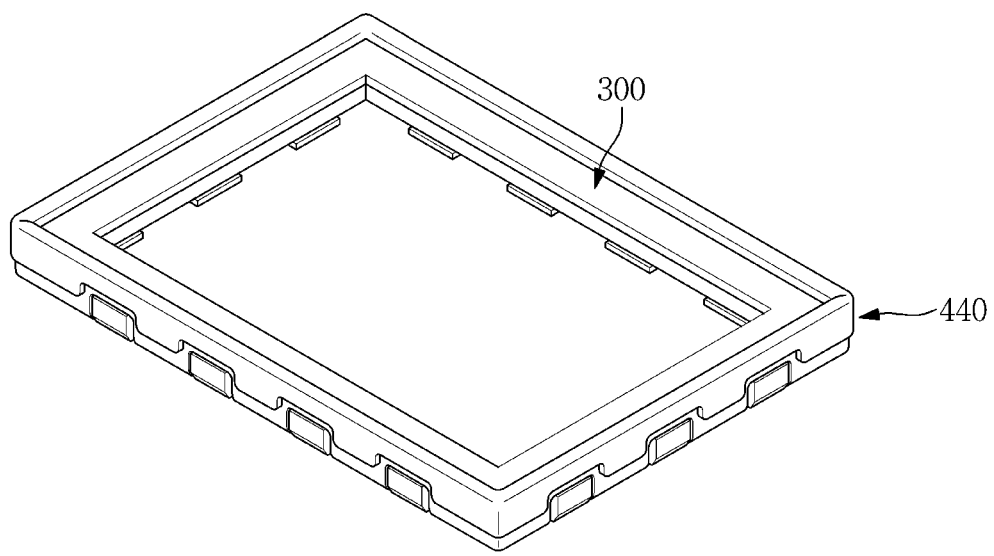
FIG. 5 is a schematic perspective view illustrating a coupling structure of a mold frame and a bottom chassis.
Figure 6:
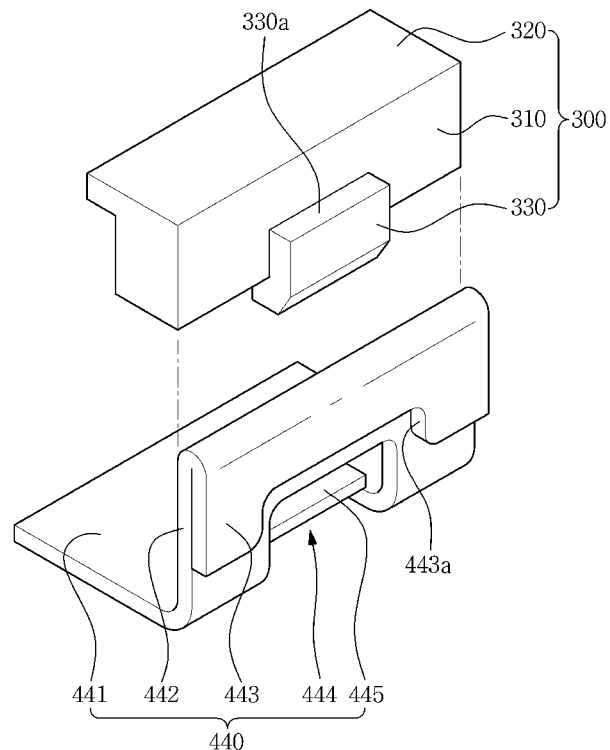
FIG. 6 is a schematic exploded perspective view illustrating cross-sections of the mold frame and the bottom chassis.
Figure 7:
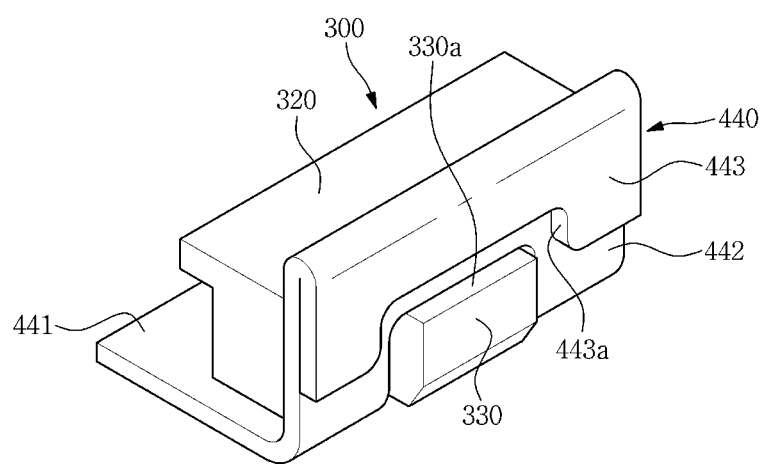
FIG. 7 is a schematic perspective view illustrating cross-sections of the mold frame and the bottom chassis.

FIG. 3 is a partial exploded perspective view illustrating "B" portion of FIG. 1. FIG. 4 is a schematic exploded perspective view illustrating a mold frame and a bottom chassis. FIG. 5 is a schematic perspective view illustrating a coupling structure of a mold frame and a bottom chassis. FIG. 6 is a schematic exploded perspective view illustrating cross-sections of the mold frame and the bottom chassis. FIG. 7 is a schematic perspective view illustrating cross-sections of the mold frame and the bottom chassis.

Referring to FIGS. 3 to 7, the bottom chassis 440 may include the bottom member 441, a support 442 bent from the bottom member 441, a hemming unit 443 overlapping the support 442, and a bent member 445. Further, the bottom chassis 440 may have a coupling hole 444 into which a projection 330 of the mold frame 300 is inserted.

The bottom member 441 may accommodate the light guide plate 420 and the light source unit 450. The support 442 may be disposed parallel to a side wall member 310 of the mold frame 300.

The hemming unit 443 may be bent from the support 442 of the bottom chassis 440 and brought into contact with one surface of the support 442. The hemming unit 443 may be disposed parallel to the support 442.

Meanwhile, the hemming unit 443 may have an aperture 443a at an area overlapping the projection 330 of the mold frame 300. The aperture 443a may overlap the coupling hole 444 of the bottom chassis 440.

The bottom chassis 440 may have the coupling hole 444 formed on at least a portion of the bottom member 441 and the support 442. The coupling hole 444 is configured to guide the projection 330 of the mold frame 300 to be coupled thereto. Accordingly, the coupling hole 444 may have a depth to allow the projection 330 to be coupled thereto.

The bent member 445 may extend from the bottom member 441 at an area overlapping the coupling hole 444. The bent member 445 may be bent toward the projection 330 of the mold frame 300. For instance, the bent member 445 may be bent, as illustrated in FIGS. 3 and 4, in a direction perpendicular to the bottom member 441 and then bent again in a direction parallel to the bottom member 441. Further, the bent member 445 may be in contact with the mold frame 300. As shown in FIG. 4, the bent member 445 may be the portion that is cut from the bottom member 441 and the support portion 442, and is folded to form the coupling hole 444. Therefore, the bent member 445 may extend from a side of the coupling hole 444.

The mold frame 300 may include a base member 320, a side wall member 310 bent from the base member 320, and the projection 330.

The base member 320 may support the display panel 200 and the side wall member 310 may be disposed parallel to the support 442 of the bottom chassis 440. The projection 330 may extend from at least a portion of one surface of the side wall member 310 of the mold frame 300.

Referring to FIGS. 3, 6, and 7, when the mold frame 300 and the bottom chassis 440 are coupled to each other, the projection 330 of the mold frame 300 is inserted to the coupling hole 444 of the bottom chassis 440 and disposed in the aperture 443a of the hemming unit 443. A portion of the support 442 of the bottom chassis 440, under which the coupling hole 444 is formed, may be disposed on a top surface 330a of the projection 330. The bent member 445 may be in close contact with a bottom surface of the support 442 and a side surface of the projection 330. That is, the bent member 445 may apply pressure to the side wall member 310 and the projection 330 of the mold frame 300 to allow the projection 330 of the mold frame 300 to be in close contact with the support 442 of the bottom chassis 440.

Accordingly, as the projection 330 and the coupling hole 440 are coupled to each other, the mold frame 300 and the bottom chassis 440 are coupled to each other. Further, as the bent member 445 is formed, coupling force between the projection 330 and the coupling hole 440 is improved in a z-axis direction.

Further, as the hemming unit 443 is formed, strength of the support 442 of the bottom chassis 440 may be improved, and coupling force between the projection 330 and the coupling hole 444 may be secured although thickness of the support 442 becomes thin.

Meanwhile, the numbers of the projection 330, the coupling hole 444, and the bent member 445 illustrated in FIGS. 4 to 7 is merely an example, and thus the numbers thereof may vary considering coupling force and process efficiency. Further, the projection 330 and the coupling hole 444 may be coupled to each other in various structures forming a hook coupling. Further, the bent member 445 may be formed into various structures that may bring about effect of applying pressure to the projection 330 of the mold frame 300 in a z-axis direction (a vertical direction in drawings).

Meanwhile, although an edge type backlight unit is described as an exemplary embodiment, various types of LCD devices including, for example, a direct type backlight unit, may employ configurations of the present invention. Further, although an LCD device is described as an exemplary embodiment, the mold frame 300 and the bottom chassis 440 of the present invention are applicable to various display devices, other than LCD devices, that can display images.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
    a display panel;
    a bottom chassis configured to accommodate the display panel and comprising a bottom member, a support bent from the bottom member, and a hemming unit overlapping the support, the bottom chassis having a coupling hole and a bent member bent from the bottom member and extending parallel to the bottom member; and a mold frame coupled to the bottom chassis and comprising a projection configured to pass through the coupling hole, the mold frame disposed between the bottom member and the display panel, wherein the projection of the mold frame directly contacts with both the support and the bent member.

2. The display device of claim 1, wherein the coupling hole is formed on at least a portion of the bottom member and the support.

3. The display device of claim 1, wherein the bent member is bent toward the projection of the mold frame.

4. The display device of claim 3, wherein the bent member is in contact with the mold frame.

5. The display device of claim 1, wherein the mold frame further comprises a base member and a side wall member bent from the base member.

6. The display device of claim 5, wherein the projection extends from at least a portion of a surface of the side wall member of the mold frame.

7. The display device of claim 5, wherein the side wall member is disposed parallel to the support of the bottom chassis.

8. The display device of claim 5, wherein the display panel is disposed on the base member of the mold frame.

9. The display device of claim 1, wherein at least a portion of the support is disposed on a top surface of the projection.

10. The display device of claim 1, wherein the hemming unit has an aperture at an area overlapping the projection of the mold frame.

11. The display device of claim 10, wherein the aperture overlaps the coupling hole of the bottom chassis.

12. The display device of claim 1, wherein the hemming unit is bent from the support of the bottom chassis.

13. The display device of claim 12, wherein the hemming unit is in contact with a surface of the support.

14. The display device of claim 1, wherein the display panel is disposed on the mold frame.

15. The display device of claim 1, further comprising a top chassis to partly cover the support of the bottom chassis and a top surface of the display panel.

16. The display device of claim 1, wherein a height of the projection measured from a surface of the bottom member is larger than a total height of the bottom member and the bent member.

* * * * *

UNITED STATES PATENT AND TRADEMARK OFFICE
CERTIFICATE OF CORRECTION

PATENT NO. : 9,897,836 B2
APPLICATION NO. : 14/813283
DATED : February 20, 2018
INVENTOR(S) : Taechang Kim Page 1 of 1

It is certified that error appears in the above-identified patent and that said Letters Patent is hereby corrected as shown below:

On the Title Page

At item (71) Applicant, the Applicant country should be changed from "Samsung Display Co., Ltd., Yongin, Gyeonggi-Do (JP)" to --Samsung Display Co., Ltd., Yongin, Gyeonggi-Do (KR)--.

Signed and Sealed this
Nineteenth Day of June, 2018

Andrei Iancu
*Director of the United States Patent and Trademark Office*